L. C. ROBINSON & J. B. GAYLOR.
PIPE COUPLING.
APPLICATION FILED FEB. 4, 1908.
919,955.
Patented Apr. 27, 1909.
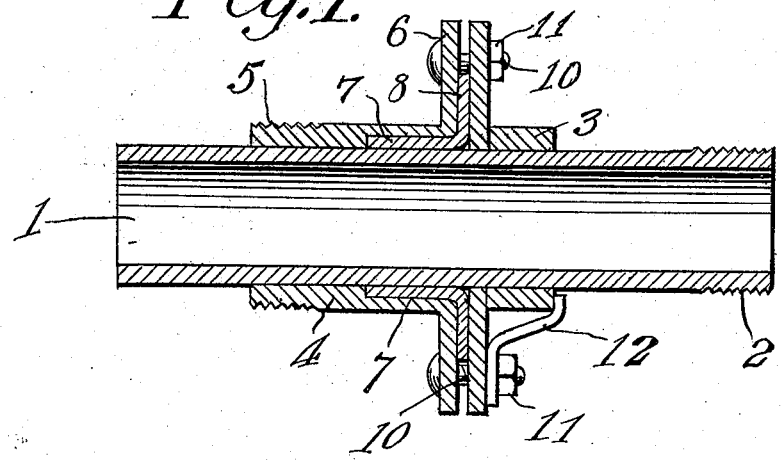
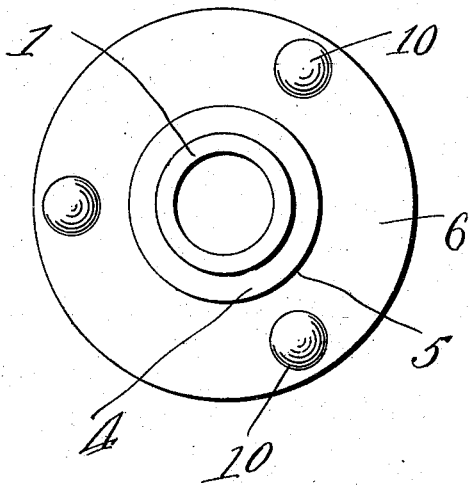 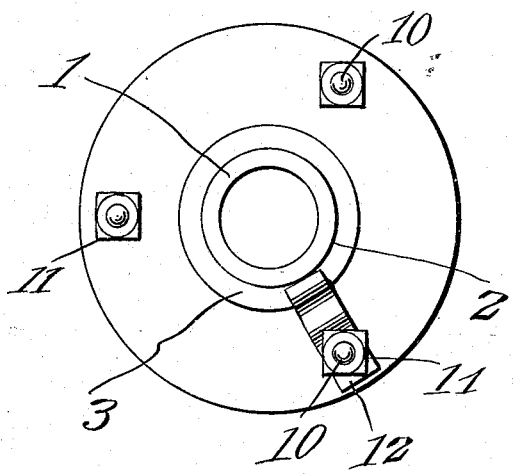
Witnesses:—
Joe P. Wahler
K. Allen.
Inventors
Loring C. Robinson,
John B. Gaylor.
By Victor J. Evans.
Attorney

UNITED STATES PATENT OFFICE.

LORING C. ROBINSON AND JOHN B. GAYLOR, OF THERMOPOLIS, WYOMING.

PIPE-COUPLING.

No. 919,955.　　　　Specification of Letters Patent.　　　　Patented April 27, 1909.

Application filed February 4, 1908. Serial No. 414,268.

*To all whom it may concern:*

Be it known that we, LORING C. ROBINSON and JOHN B. GAYLOR, citizens of the United States, residing at Thermopolis, in the county of Fremont and State of Wyoming, have invented new and useful Improvements in Pipe-Couplings, of which the following is a specification.

Our invention relates to pipe couplings, and its primary object is to provide a device of this character by means of which two pipes can be connected together for relative rotary movements, the invention being especially adapted for connecting a discharge pipe with the outlet of a rotary pump.

A further object of our invention is to provide a pipe coupling which is simple, durable and efficient, and which can be manufactured and sold at a comparatively low cost.

With the above and other objects in view, the invention consists in the construction, combination and arrangement of parts hereinafter fully described, claimed and illustrated in the accompanying drawing, wherein:

Figure 1 is a central longitudinal sectional view of a pipe coupling constructed in accordance with our invention. Fig. 2 is a view in end elevation thereof, and Fig. 3 is a view similar to Fig. 2, looking at the coupling from the opposite end.

Referring to the drawing by reference numerals, 1 designates a tubular member which can be of any length and which is provided at one end with externally arranged screw threads 2. A collar 3 embraces the member 1 and is secured thereto in any suitable manner. The collar 3 is located adjacent the transverse center of the tubular member 1, and if found desirable it may be formed integral therewith. A coupling sleeve 4 is rotatably mounted upon the tubular member 1. The relatively outer end of the coupling sleeve 4 is provided with externally arranged screw threads 5, while the relatively inner end thereof is provided with a laterally projecting annular flange 6. The relatively inner end of the coupling sleeve 4 is also provided with an annular recess 7 adapted to receive one member of a washer 8 which is angular in cross-section. The other member of the washer 8 is interposed between the flange 6 and a disk 9, said disk being rotatably mounted upon the tubular member 1 between the washer and the collar 3. The coupling sleeve 4, washer 8 and disk 9 are secured together by means of bolts 10 and nuts 11, the bolts passing through the flange 6 and disk 9. The coupling sleeve 4 and its attendant parts are secured to the tubular member 1 against longitudinal displacement by means of a hook 12 which is carried by one of the bolts 10 and which is adapted to engage the collar 3 in the manner disclosed in Fig. 1 of the drawing.

In practice, a pipe section is secured to the tubular member 1 through the medium of the threads 2, and another pipe section is connected to the coupling sleeve through the medium of the threads 5. The coupling sleeve may, however, be directly screwed into the outlet port of a rotary pump. The connection between the tubular member 1 and the coupling sleeve 4 is such that the pipe sections or the pipe section and pump may rotate one with relation to the other. The liquid passes through the tubular member 1, and the washer 8 forms a liquid-tight joint between the coupling sleeve and said member. It should be apparent that the parts of the device may be readily disassociated to replace the washer.

From the foregoing description taken in connection with the accompanying drawing, the construction and mode of operation of the invention should be understood without a further extended description.

Changes in the form, proportions and minor details of construction may be made within the scope of the claim without departing from the spirit or sacrificing any of the advantages of the invention.

Having fully described and illustrated our invention, what we claim is:

A pipe coupling comprising a tubular member threaded at one end, a collar fixed to the tubular member, a coupling sleeve rotatably mounted on the tubular member and threaded at one end, the opposite end of the sleeve being provided with an annular flange and an annular recess, a disk rotatably mounted on the tubular member between the collar and the flange, an angular washer having one of its members mounted in the recess and its other member between the
5 flange and the disk, bolts passing through the flange and the disk to secure the disk to the sleeve, and a hook carried by one of the bolts and engaging the collar.

In testimony whereof we affix our signatures in presence of two witnesses.

LORING C. ROBINSON.
JOHN B. GAYLOR.

Witnesses:
W. H. JOHNS,
STEPHEN CARVETH.